United States Patent

[11] 3,594,067

| [72] | Inventor | Paolo Garbati<br>Via Sonnino 37, Cagliari, Italy |
|------|----------|---|
| [21] | Appl. No. | 834,315 |
| [22] | Filed | June 18, 1969 |
| [45] | Patented | July 20, 1971 |
| [32] | Priority | Apr. 23, 1965 |
| [33] | | Italy |
| [31] | | 697,762/65 |
| | | Continuation-in-part of application Ser. No. 543,145, Apr. 18, 1966, now abandoned. |

[54] VARIABLE FOCAL LENGTH OBJECTIVE FOR ROTARY CAMERAS
13 Claims, 14 Drawing Figs.

[52] U.S. Cl. .................................................. 350/186, 95/15, 350/187
[51] Int. Cl. ................................................. G02b 15/18
[50] Field of Search ........................................... 350/184, 186, 187, 21, 22, 198; 95/15

[56] References Cited
UNITED STATES PATENTS

| 1,136,761 | 4/1915 | Becker | 350/184 UX |
| 2,873,646 | 2/1959 | Angenieux | 350/187 |
| 3,069,972 | 12/1962 | Tibbetts et al. | 350/186 X |

*Primary Examiner*—John K. Corbin
*Attorney*—Steinberg and Blake

ABSTRACT: A lens for a rotary or panoramic camera. The lens includes a pair of optical systems at least one of which is movable along their common optical axis with respect to the other, so as to provide a lens of variable focal length. The entire lens is also adjustable along the optical axis for focusing purposes. A manually operable adjusting structure is provided for adjusting the lens, and this adjusting structure includes graduations indicating different object distances. The adjusting structure provides for each object distance a given focal length, so that the focal lengths and object distances have a predetermined relationship with respect to each other. This relationship provides for any selected object distance a focal length which will prevent movement or creeping of the image with respect to the film which receives the image.

INVENTOR.
PAOLO GARBATI

BY
*Steinberg & Blake*
ATTORNEYS

INVENTOR.
PAOLO GARBATI

INVENTOR.
PAOLO GARBATI

INVENTOR.
PAOLO GARBATI
BY
*Steinberg & Blake*
ATTORNEYS

VARIABLE FOCAL LENGTH OBJECTIVE FOR ROTARY CAMERAS

CROSS REFERENCE TO RELATED APPLICATION

This application is a continuation-in-part of copending application Ser. No. 543,145, filed Apr. 18, 1966, and entitled Lens With Variable Focal Length in its Use on Rotary Cameras, now abandoned.

BACKGROUND OF THE INVENTION

This invention concerns a lens with variable focal length, and designed to be fitted on rotary cameras. In more detail, the invention relates to the application of a lens with variable focal length to rotary cameras.

As rotary cameras are defined those wherein: 1st) The lens and the window are turned in respect of stationary film that rests on an arched support, and 2nd) The rotation of lens and window is associated with a simultaneous rotation and translation of film that extends on a plane behind the window. The former camera type will be hereinafter called "rotary lens camera," while the latter camera type shall be identified by the term "rotary head machine."

Azimuthal angles of ab. 140° are covered by the rotary lens camera, which cannot be qualified as an optically complete camera.

Conversely, azimuthal angles of any amplitude can be covered by the rotary head camera, which can thereby be considered as a camera that is complete from an optical viewpoint. Such rotary head camera is disclosed in the U. S. Pat. No. 3,363,527 granted to same applicant, and to which reference is made for further details concerning the design, and the principle whereon it is based.

Lens systems having a fixed focal length are used in either above-stated camera types.

Lens systems with variable focal length are already known, wherein the whole optical system of lenses, or a part thereof, can be adjusted by a ring nut, in respect of the image plane (or film), in order to have the image focused thereon, being also a further threaded ring provided, to adjust at least one optical system, pertaining to said lens system, in respect to the other system(s) of same lens, thereby to vary the lens focal length, in order to obtain enlargements of the object. The latter threaded ring bears usually no graduations, but sometimes indications referring to focal length are marked thereon, in order to allow the operator to know, and thus to set the required focal length, whereby to obtain the desired enlargement of the object of which a picture is taken.

SUMMARY OF THE INVENTION

The main purpose of this invention consists in the provision of a lens with a variable focal length, that can be utilized on either camera types as specified above, not in order to obtain the so called tracking shot effect, as in the conventional cameras, but rather to reduce the horizontal and vertical sizes of the rotary head cameras, and to positively prevent some noticeable defects of the pictures obtained with the rotary lens machines, when these latter are to be utilized for taking pictures of objects that are at much different distances from each other. The above and further purposes, which will be outlined more clearly in the following, detailed description, are attained by a lens system with variable focal length, and comprising at least—and preferably—two optical systems, which can be drawn near, or away from one another by means of a first threaded ring, while a second threaded ring is provided by which both optical systems are adjusted, to have the object focused onto the frame.

It is also among the objects of the present invention to provide a lens designed for application in the specified types of cameras, wherein both focusing and focal length changes are allotted to a single ring nut graduated at $p$ distances from the object, on the basis of the below-cited formula, said lens not requiring to be moved as single unit and to coordinate said movement with that of the optical parts comprising it. Particularly, the ring nut movement controls the movement of an optical unit, in the case comprising one lens only, relative to the remainder of the whole optical system for the lens or objective.

According to the invention, the focal length threaded ring is graduated in distances $p$ of the object, which are calculated in such a manner as to conform themselves to the following formula:

$$p = f\frac{2f_0 - CQ_0 - N_1N_2 \pm \sqrt{(CQ_0 + N_1N_2)^2 + 4f(f_0 - CQ_0 - N_1N_2)}}{2(f_0 - f)}$$

wherein the root of $p$ is selected in such a manner that $p > f > o$, and wherein:

$f$ = the focal length that is selected in each case,
$f_0$ = the focal length of lens which correspond to taking a picture of an object at the infinity.
$CQ_0$ = The distance of rotation center from the film.
$N_1N_2$ = The distance between the nodal points of the whole lens system, or, as a particular case of the preceding formula, to following formula:

$$p = f\frac{f_0 - N_1N_2 \pm \sqrt{(f_0 + N_1N_2)^2 - 4fN_1N_2}}{2(f_0 - f)}$$

where the symbols have the same meaning as stated above, and which is obtained from the preceding formula by putting $CQ_0 = f_0$, i.e. by having the rotation center ($C$) of lens coincident with the second nodal point of lens, when this latter is set for taking a picture of an object at the infinity.

It is to be pointed out that while the first formula can be applied to rotary head cameras only, the second formula can be applied both to rotary head cameras, and to rotary lens cameras.

BRIEF DESCRIPTION OF DRAWINGS

The invention will be better appreciated from a consideration of the following, detailed description of a preferred embodiment form thereof, taken with the accompanying drawings, being both description and drawings given as a not restrictive example only. In same drawings.

DESCRIPTION OF PREFERRED EMBODIMENTS

For a better understanding of the operation of rotary cameras from the optical viewpoint, a previous investigation is required of the phenomena which take place as soon as a lens starts to turn in respect of an axis perpendicular to main optical axis, and that extends through a point of latter axis. In carrying out said search, reference will be made to FIG. 1 of accompanying drawings, wherein an optical-geometrical diagram is shown, which is designed to explain the phenomena that are taking place.

Figure 1:
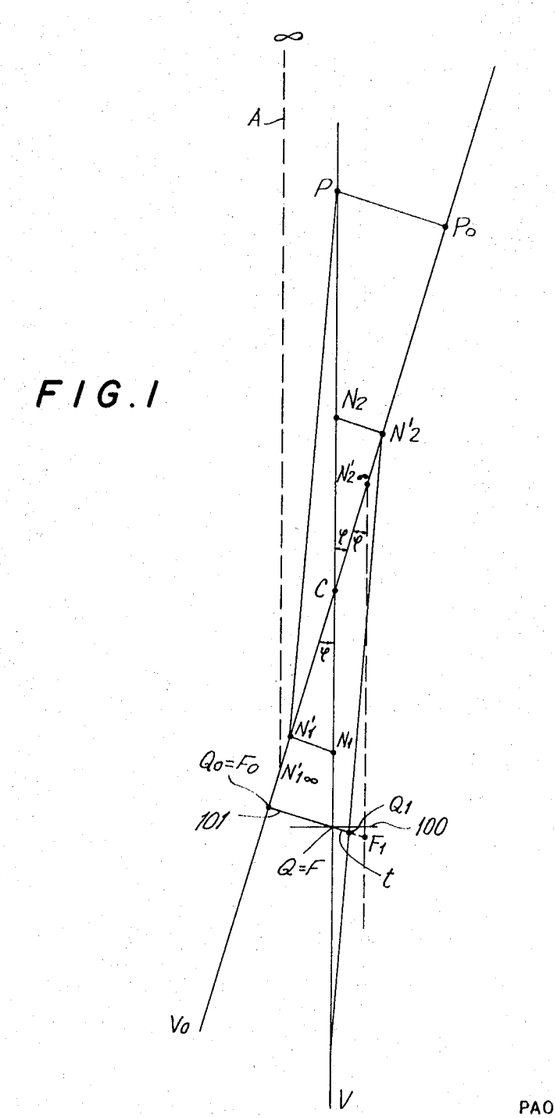
FIG. 1 is a geometrical-optical diagram, that is designed to explain the phenomena which occur when a lens is being turned.

In said figure, a camera lens is shown which is defined by its nodal points $N_1$ and $N_2$, by its second focus F, and its main optical axis whereon said three points are lying.

Let us assume that the lens can be turned round an axis perpendicular to the plane of drawing, and by which the main optical axis of lens is intersected as in C.

Let us assume, also, that rigidly connected with the main optical axis of the lens, and perpendicularly to same axis, is a film or image plane 100, by which said optical axis is intersected in the point Q, that represents the image of a point $p$, located on the main optical axis.

We will assume, further, that the segment $CN_2$ is to be considered as positive when $N_2$ is more distant from the image than C; that the segment $N_1N_2$ is to be considered as positive when $N_2$ is more distant from Q than $N_1$, and that $CN_1$ is to be considered as positive when $N_1$ is nearer to Q.

By putting: $N_1P=p$
$N_2Q=q$
$N_2F=f$ then the well known lens relation, according to which:
$q=pf/p-f$
is valid.

It is expedient to point up that, to have an object focused on an image plane 100, the lens can be moved along the optical axis. Thus, when a picture of a point at the infinity is to be taken, and same point is focused on the image plane, the image of infinity point, located in the direction of optical axis PV, will be represented by the point P (or second focus) that is coincident with the point Q.

When the optical axis PV is turned in a clockwise direction until the position PoVo is attained, and by assuming that the rotation angle is very small, e.e. of 1, 2 or 3 degrees only, whereby it can be put $\sin \zeta = \Phi$, then $\cos \zeta = 1$.

Owing to smallness of angle $\zeta$, and to field depth inherent to lens, the points Q, $N_1$, $N_2$ can be considered as respectively moved to $Q_o$, $N'_1$, $N'_2$, which represent the intersection points of lines drawn perpendicularly to shifted axis C $Q_o$, from the respective points Q, $N_1$ and $N_2$. In such a case, the image plane 100 is coincident with the straight line $Q_oQ$.

After said shifting, the new image of point P will be represented by the point $Q_1$, which is the point wherein the image plane 101 is intersected by the straight line drawn from the nodal point $N'_2$, and parallel to joining line P $N'_1$. The new position of the image of an infinity point, is given by the point $F_1$ in which the shifted image plane 101 is intersected by the line parallel to direction A, and that passes through the nodal point $N'_{200}^{\infty}$ Thus, as a consequence of said rotary motion, a shifting of the image, equal to Q $Q_1$, is occurred in respect to a standing observer. Said segment Q $Q_1$ is specified by the letter $t$, and will be hereinafter called: "entraining of the image"; segment shall have a positive value when the shifting occurs in a direction opposite to that of lens rotation.

Considering now the similar triangles $N_2$, $N'_2$, V; $Q_1$, Q, V and $N'_1$, C, P; $N'_2$, C, P, by obvious substitutions and taking into account the relations that exist between the different segments (and which can be deduced from the FIG. 1,) we come to the following expression:

$$t=\frac{pCN_2-qCN_1}{p}tg\varphi=\frac{pCN_2-fN_1N_2}{p-f}tg\varphi \quad (1)$$

The hereinafter stated particulars cases—which have a remarkable importance in the experimental determination of nodal points—may occur:

A. When $p=\infty$, it is $t_\infty=CN_{2\infty}tg\varphi$, and if the axis passes through $N_{2\infty}$ we obtain $t_\infty=0$, for C coincident with $N_{2\infty}$ (2) i.e. when the rotation axis of a lens, perpendicular to main optical axis, passes through the second nodal point, the images of objects at the infinity, have a nil entrainment.

B. When $C=N_1$, the (1) becomes:
$$t=N_1N_2 tg\ \zeta \quad (2')$$

independently from $p$, and therefore: when the rotation axis of a lens, perpendicular to main optical axis, passes through the first nodal point, the same entrainment occurs in the images of objects that are located at different distances.

C. By putting $t=0$ in the (1) it follows that $pCN_2=qCN_1$. When $p=\infty$, it must be $CN_2=0$, and therefore $CN_1$ may be either positive, nil or negative. If $p\neq\infty$, since $p$ and $q$ shall necessarily be positive, it follows that $CN_1$ and $CN_2$ must have the same sign, which means that $N_1$ and $N_2$ shall be located on bands opposite in respect of C, that is to say: when the lens is adjusted on an object which is at small distance, a point inside to the segment $N_1N_2$, and through which extends the rotation axis, can always be found, thereby obtaining a zero entrainment of the image.

$CN_2=l\ CN_1$, where $l$ represents the linear enlargement, can be easily found.

As effect of the rotation of the optical axis, in respect to an observer which stands still with the lens, a shifting equal to $Q_oQ_1$ i.e.:

$$Q_oQ=Q_oQ+t=(q-CN_2)tg\varphi+\frac{pCN_2-qCN_1}{p}tg\varphi$$

$$=\frac{q(p-CN_1)}{p}tg\varphi=\frac{p-N_1N_2+CN_2}{p-f}ftg\varphi$$

is occurred in the image Q of point P, and since (see FIG. 1)

$$CQ_0=q-CN_2=f-CN_{2\infty} \quad (3)$$

by substituting the value obtained from the preceding relation for $CN_2$, we obtain:

$$Q_0Q_1=\frac{p^2-(p-f)(CQ_0+N_1N_2)}{(p-f)^2}ftg\varphi \quad (4)$$

for $p=\infty$ we have:

$$F_oF_1=ftg\ \zeta \quad (5)$$

The term $CQ_o$ is not included in the latter relation, i.e. the distance of rotation axis from focal plane is no more indicated, and therefore we come to the enunciation:

In order that the image of an object at the infinity shall have a zero entrainment, it is necessary and sufficient that the film be advanced, in respect of the lens, for an amount equal to the product of the focal length and of the geometric tangent of the angle of rotation of same lens, independently from the position of the rotation axis in respect of focal plane.

From the above considerations it follows that, to prevent the defects caused by the creeping in a picture, i.e. to prevent that the image of a given point, that is viewed through a lens is displaced while same lens is being turned, the aforestated conditions shall be satisfied; in the particular case of a rotary head camera: the rotation of lens shall be associated with a translation motion of film in respect of same lens, which is substantially equal to $Q_oQ_1$, while in the particular case of rotary lens cameras, $t$ shall be substantially equal to zero.

Let us consider now the rotary lens camera.

In such a camera, the only rotary component is the fixed focal length lens, while the film, that is located on an arc of circle with the center C, through which the rotation axis extends, stands still while the picture is being taken. In the considered camera, the above stated angle $\zeta$ is that angle under which an observer, standing in the point C, can see the picture gate or window. By assuming that the aperture of gate be of 1 mm, that the focal length of lens be of 50 mm, and that the second nodal point is coincident with the center C when a picture of an infinity point is taken, it follows that the tangent value of said angle is of 1/50, i.e. it is a very small angle, whereby the above assumptions are valid.

Obviously, due to structural reasons, the lens of such cameras can never be turned through an angle of 180°, and in the practice angles up to ab. 140° can be attained only. Owing to the immobility of the film in respect of the object, the creeping of the image shall be nil, or it may have a negligible value only on the frame. Since in such cameras, panoramic shots—i.e. pictures of objects located at the infinity—are mainly of interest, it must be $CQ_o=f(6)$, when the particular case wherein $CN_{2\infty}=0$ is considered. Therefore, in same cameras the distance of image plane from the center of rotation shall be equal to the focal length.

Two drawbacks are encountered in such cameras:

a. The images that are formed by the lens, are lying on a plane, while the film rests on an arched support. Thus, each point of an image is in part focused and in part out of focus, which results in a worsening of the features of the obtained picture. Said ill-effect can be obviated, within the limits of field depth, by the used of a very narrow film gate.

b. When near standing objects are to be focused, then the lens is moved away from the film. As a consequence thereof, the distance $CN_2$ becomes greater than zero, and thus the condition (6) according to which the distance of the rotation axis from the image plane shall be equal to focal length, is no more satisfied. Consequently, a relative motion of image to film occurs, that is to say the quality of picture is prejudiced by creeping phenomena. Such creeping is prevented only under the condition $N_1N_2=\dfrac{pf}{p-f}$ where $p$ is the min. distance that can be evaluated by the lens.

Let us consider now the rotary head machines, which form the object of another Patent in the same of same applicant.

As already well-known, the mechanical-optical equation:

$$\frac{f}{e}=\frac{R}{r} \quad (7)$$

is applicable to such cameras. In same equation, $f$ is the focal length of lens, $R$ is the radius of takeup sprocket, $\rho$ and $r$ respectively are the radiuses of pitch circles of two friction or toothed wheels, being the wheel $\rho$ fast with the base of camera, while the wheel $r$ turns along with the sprocket $R$.

From the relation (4) it can be inferred that, for the case of objects at the infinity, no influence is exerted by the distance $CQ_o$ of the rotation axis from the image plane. When the pictures of near standing objects are to be taken, since the film feed is always the same, by equality of rotation angle of head, it is obviously necessary that the length $Q_oQ_1$ is equal to segment $F_oF_1$, to prevent a creeping under two extreme conditions, i.e.:

$$\frac{p^2-(p-f)(CQ_0+N_1N_2)}{(p-f)^2}ftg\varphi=ftg\varphi$$

wherefrom the following relations are obtained: $CQ_o=q+f-N_1N_2$ $CN_2=N_1N_2-f$ $CN_1=f$ (8) which are valid for values of $q$ that correspond to min. distance $p$ of the object. When such conditions are satisfied, then the creeping is nil, either at the min. distance of the object which depends on the lens type, and at the infinity distance $p\infty$. It can be demonstrated that the creepings which occur when taking pictures of objects at distances intermediate between the min. and max. values of $p$, are wholly admissible in such machines. However, same machines necessarily have large diameters and heights, as clearly shown by the relation $CQ_o=q+f-N_1N_2$. At any rate, such sizes can be materially reduced by the use of lenses having variable focal lengths.

As already well-known, a lens having a variable focal length is an optical system which focal distance can be adjusted according to the operator's requirements. It is always designed in such a way that, after having been focused on an object, the focal length can be changed at will without causing the image to get out-of-focus.

A small incursion of focal lengths, of order from $f$ to $f+(f/5)$ (i.e. of 1.2 times) is sufficient for the use of the above lenses on rotary machines.

For a better understanding of the use of same lenses, the equation:

$$Q_0Q_1=\frac{p^2-(p-f)(CQ_0+N_1N_{2'})}{(p-f)^2}\cdot ftg\varphi \quad (4)$$

is to be considered.

Such equation clearly shows that, when the distance $CQ_o$ between rotation axis and film is kept constant, then by equality of rotation $\zeta$ the film transport $Q_oQ_1$ can be kept always constant (thereby preventing any creeping for all values of $p$) by the adoption of an infinite number of turns of values $p$, $f$, $N_1f$, $N_1N_2$: $p'$, $f'$, $N'_1N_2$, fo, $N_1N_2$, each corresponding to a lens having a single focal length, to be fitted on 2, camera, e.g.:

$$Q_0Q_1=\frac{p^2-(p-f)(CQ_0+N_1N_2)}{(p-f)^2}ftg\varphi$$
$$=\frac{p'^2-(p'-f')(CQ_0+N_1'N'_2)}{(p'-f')^2}$$
$$f'tg\ \varphi=\ldots f_0 tg\varphi$$

wherefrom, by summarizing:

$$\frac{p^2-(p-f)(CQ_0+N_1N_2)}{(p-f)^2}\cdot f=f_0 \quad (9)$$

wherein $(p, f, N_1N_2)$ correspond to generic lens having a focal length $f$, and a distance $N_1N_2$ between the nodal points, adjusted on an object located at a generic distance $p$ from $N_1$ while $(f_o)$ correspond to a lens having a focal length $f_o$, and adjusted on objects at the infinity. Now, in any centered dioptric system, a change in the focal length results in a change in the $N_1N_2$ and thus from the preceding equation it can be inferred that $p$ is a function of $f$, with the particular value $p(f_o)=\infty$.

By solving the (9) for $p$, we have:

$p=f$ $$\frac{2f_0-CQ_0-N_1N_2\pm\sqrt{(CQ_0+N_1N_2)^2+4f(f_0-CQ_0-N_1N_2)}}{2(f_0-f)}$$

(10)

From what precedes it can be inferred that a lens which is able to keep the value $Q_oQ_1$ always constant, whatever the distance of $p$ may be, cannot be other than a lens having a variable focal length which, as already well-known, may be considered as a combination of an infinite number of lenses, by which the stated conditions are satisfied.

In all lenses having a variable focal length, and suited to be fitted on conventional cameras and motion picture cameras, the threaded ring by which the focal length is adjusted, can be turned independently from the focusing threaded ring. In the traditional cameras, a change in the focal length results in a variation of the image enlargement on the film.

In the considered lens with variable focal length, the object which is aimed at, is not that of a change in the image enlargement on the film, but rather that of a correlation between focal length and distance of the object, according to which each value of $p$ corresponds to a value of $f$ and vice versa, in such a manner as to keep the film transport, that is performed by the related mechanism, wholly constant. Conversely, in the rotary lens cameras, where the film is stationary, and rests on an arched support, the lens with variable focal length, is designed to compensate for the change in the $CN_2$, that is caused by the focusing of objects located at distances much different from each other.

In the lens with variable focal length according to the invention, the focal length threaded ring and the focusing threaded ring are firmly connected with each other, which means that a particular value of $f$ always correspond to a particular value of $p$, thus, also the focal length threaded ring is graduated in distances $p$, whereby the operator, by which the lens is adjusted on a given distance $p$ by means of the usual focusing threaded ring, is compelled to turn also the focal length threaded ring, in order to bring the value $p$ thereof in coincidence with the reference mark.

Due to the strict connection existing between $p$ and $f$, no need exists that the image be kept focused on the film while the focal length is being adjusted, as in the case of conventional lenses with variable focal length.

The above fact results in a great advantage in the production of lenses suited for rotary cameras, since the intricated mechanism necessary for the conventional lenses are no more required, which allows, in point of fact, a not negligible reduction in the costs. Thus, lenses consisting of two optical systems only, can be made; in such lenses, the one threaded ring (focal length ring) serves for having said two systems moved nearer or apart from one another (focal length threaded ring), while the other threaded ring serves to have the whole lens moved nearer or apart from the film plane (focusing threaded ring).

What is stated above is valid for any fixed value of $CQ_o$. However nothing stands against the setting of a single value, which could be always valid for all lenses with variable focal length, suited for rotary cameras. A further saving in the costs can be thereby obtained since rotary cameras designed for a particular value of $f_o$ (focal length corresponding to $p=\infty$) can be equipped with lenses having similar $f_o$, and made by different makers with different optical systems.

A suitable value is obtained by putting:

$$CQ_o = f_o \quad (11)$$

whereby the same lens can be fitted both on rotary lens cameras, and on rotary head cameras, for which there are the following equations:

$$CQ_o = f_o, \quad \text{and respectively} \quad \frac{f_0}{e} = \frac{R}{r}$$

By substituting the $CQ_o = f_o$ in the preceding equation (9), and after having developed, ordered and finally solved, we obtain the equation:

$$p = f \frac{f_0 - N_1N_2 \pm \sqrt{(f_0 + N_1N_2)^2 - 4fN_1N_2}}{2(f_0 - f)} \quad (12)$$

wherein the root of $p$ is selected such that $p > f > 0$.

In the determination of values of $p$ that correspond to different values of $f$, it becomes necessary to establish the value of $N_1N_2$ which while being function of $f$, will require in many cases time-consuming and tiring method of determination. Such search after the nodal points is made much more easy by having recourse to the above discussed equation (2). Such equation tells us that when the axis of rotation of a lens, perpendicular to main optical axis, passes through the second nodal point, then the images of the objects at the infinity shall have a zero creeping.

Figure 2:
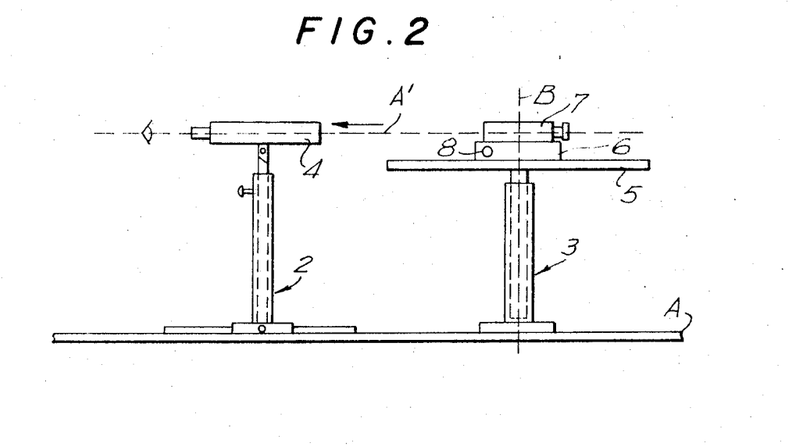
FIG. 2 diagrammatically shows an arrangement that is utilized for the experimental search of nodal points.

The equipment that is diagrammatically shown in FIG. 2 can be utilized for the above purpose. A binocular microscope 4 fitted with crosshair lines, and a turntable 5, are respectively supported, on an horizontal plane A, by two adjustable height supports 2 and 3. The rotation axis B of turntable shall always be intersected perpendicularly by the main optical axis A of the binocular microscope. A support 6, wherein the lens 7, the nodal points of which are to be determined, is accommodated and locked, is fitted on said turntable. Latter support can be micrometrically adjusted at will by the operator, by means of the knob S. The amount of micrometrical adjustment can be read on a scale with vernier, carried by the turntable, and having its initial point on the rotation axis B. The main optical axes of both binocular microscope and lens shall lie on a common horizontal plane.

The operator sights through the binocular microscope 4, first of all the rear part of lens 7; then the turntable 5 is slowly turned by hand both to the left, and to the right, in such a manner as to have the whole lens field passed before the crosshair lines. A creep will be observed in the images of the objects. The observer sights an infinity point, lying on the common axis binocular microscope-lens A. If a creep is suffered by the image, the position of supporting cradle 6 is to be adjusted along the main optical axis of lens until, though the turntable is being turned, the image will stand wholly still on the vertical crosshair lines of microscope. This means that the second nodal point is intersected by the rotation axis, whereby same nodal point is located. The nodal point $N_1$ is then determined by repeating the same operations, however after the lens has been turned through 180°, i.e. in such a manner that the fore section of same lens can be sighted through the binocular microscope. The two values $CN_1$ and $CN_2$, which sum is obviously equal to $N_1N_2$, are thereby obtained.

The formula (2') can be utilized for a check of the above-described observations. Said formula tells us that, when the rotation axis of a lens, perpendicular to main optical axis, passes through the first nodal point, then the same creep is observed in the images of all objects that are located at different distances from the lens.

Such check method consists in adjusting the support cradle 6 until the images of all objects that are at different distances from the lens, show the same creep. This means that the rotation axis passes through the first nodal point $N_1$, which is thereby located. Then the turntable 5 is turned through 180°, whereafter the nodal point $N_2$ is located in the same way.

Figure 3A:
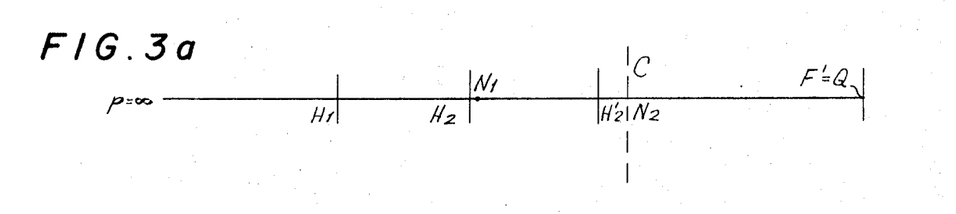
FIGS. 3a, b and c diagrammatically show a lens having two optical systems, and adjusted on three different distances.
Figure 3B:
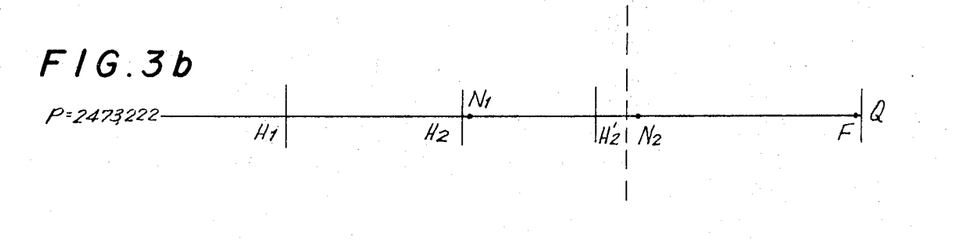
Figure 3C:
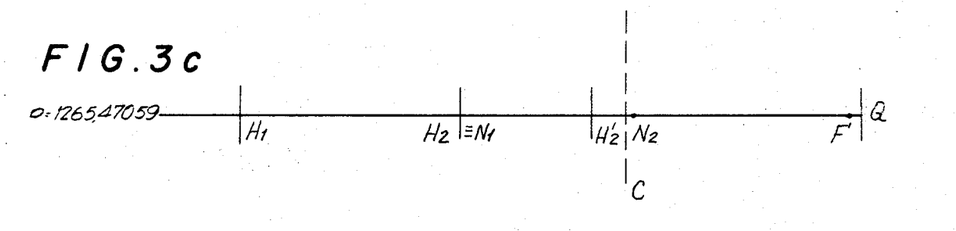

A lens comprisive of two optical systems only is shown, by way of an example only, in the FIGS. 3–3c, being such lens suitable to be fitted on rotary cameras.

As stated above, such lens consists of two optical systems only. Let us make the convention that $H_1$ and $H'_1$ are the nodal points, and $f_1$ is the focal length of the first of said systems, i.e. of that which is nearer to the object, while $H_2$ and $H'_2$ are the nodal points and $f_2$ is the focal length. It is assumed that there is the distance $H'_1H_2$ between the two systems, while $H$ and $H'$ respectively are the first and second nodal point of the assembly; finally, be $F'$ the focus of the lens thus formed. Be moreover Q the point through which passes the plane tangent to film, putting also $=a-f_1-f_2$. From the rules of elemental optics, and from what is stated above, we obtain:

$$f = -\frac{f_1 f_2}{\Delta};$$

$$H'_2 P' = \frac{f_2(a - f_1)}{\Delta};$$

$$N_1N_2 = -HH' = -\left(H_1H'_1 + H_2H'_2 + \frac{a^2}{\Delta}\right)$$

$p = $ value of the (12);

$$q = \frac{pf}{p - f};$$

$H'_2Q = H'_2F' + q - f;$ $CN_2 = q - f_0;$ $CN_1 = N_1N_2 - CN_2;$ $N_1Q = q - N_1N_2;$ $H_1Q = a + H'_2Q + H_2H'_2 + H_1H'_1;$ $H_2C = H'_2Q - f_0 = $ distance of $H'_2$ from the rotation axis;

$QP = p + N_1Q + $ Distance of the object from the film.

Let us assume, as a simple example, that the lens is formed by two systems, of which the first one consists of a diverging lens with $f_1 = -300$ and $H_1H'_1 = 0$, while the second system consists of an independent lens having $f_2 = 50$ and $H_2H'_2 = 30$. All values are in millimeters.

By putting for $\bar{p} = \bar{\infty}$:

$a = a_o = 30$, wherefrom we obtain:

$f_o = 53,57143; H'_2F' = 58.92750;$ $N_1N_2 = -33.21423; \bar{p} = \bar{\infty}; q = f_o;$ $N'_2Q = N_2F'; CN_2 = 0; \overline{CN_1} = \overline{N_1N_2};$ $N_1Q = 86.78566; H_1Q = 118.92750;$ $N'_2C = 5.35607; Q\bar{P} = \infty.$

| $a$ | $N_1N_2$ | $f$ | $H_2'F'$ | $p$ | $q$ | $H_2'Q$ | $CN_1$ | $CN_1$ | $N_1Q$ | $H_2Q$ | $H_2'C$ | $QP$ |
|---|---|---|---|---|---|---|---|---|---|---|---|---|
| 30 | −33.214 | 53.754 | 58.927 | ∞ | 53.751 | 58.927 | 0 | −33.214 | 86.786 | 118.927 | 5.353 | ∞ |
| 40 | −35.517 | 53.724 | 58.620 | 2,473.222 | 52.829 | 59.725 | −0.743 | −34.775 | 88.346 | 129.725 | 6.154 | 2,561.568 |
| 50 | −38.333 | 50 | 58.333 | 1,265.471 | 52.057 | 60.391 | −1.514 | −36.819 | 90.391 | 140.391 | 6.819 | 1,355.861 |

The above values are shown in the FIGS. 3a, b and c.

The values to be introduced in the formula (12) are those well known from the elemental optics, e.e.:

$p = PN_1$ (distance of the object from the first nodal point of the assembly);

$$f = \frac{-f_1 f_2}{a - f_1 - f_2}$$

$$f_o = -\frac{f_1 f_2}{a_o - f_1 - f_2}$$

($a_o$ = distance between the two systems when an object at the infinity is sighted)

$$N_1 N_2 = -\left( H_1 H'_1 + H_2 H'_2 + \frac{a^2}{a - f_1 - f_2} \right).$$

The invention covers also a design wherein the lens, instead of being equipped with two separate threaded rings, is fitted with one threaded ring only, which acts mechanically, by having the motions of the lens as a whole, and the motions of the movable optical components of same lens, properly coordinated with one another, whereby by a single operation the focusing and the adjustment of focal length as function of the distance are obtained.

Figure 4:
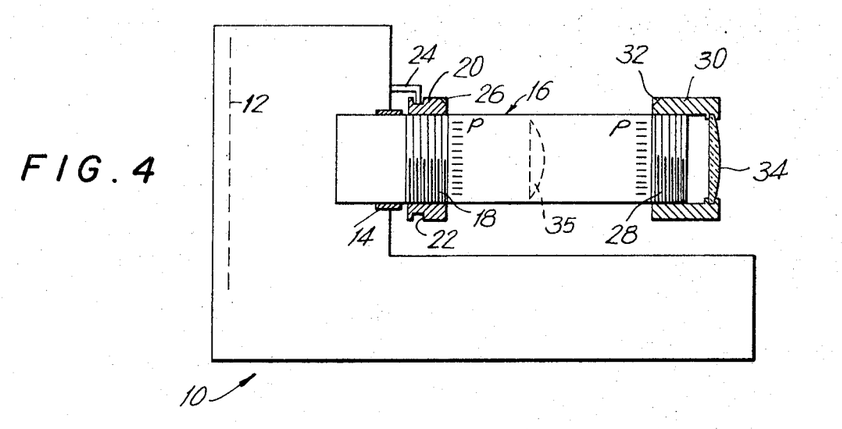
FIG. 4 is a schematic, partly sectional illustration of one embodiment of a lens of the invention shown in association with a camera.

FIG. 4 schematically illustrates an embodiment where two threaded adjusting rings are provided to embody the means for adjusting the lens to provide the predetermined combinations of focal length and object distance. Referring to FIG. 4, it will be seen that the camera housing 10, which is schematically represented, has in its interior the film or image plane 12. The housing 10 is provided with a suitable bearing 14 which supports the objective 16 for axial movement while preventing rotary movement thereof. The objective 16 is formed adjacent its rear end with threads 18 coacting with the inner threads of an adjusting ring 20 which is formed with a groove 22 receiving the stationary pin 24, so that while the ring 20 can turn it cannot move axially, and thus by coacting with the threads 18 will adjust the axial position of the entire objective 16 for focusing purposes. The ring 20 has an index 26 coacting with graduations $p$ of object distances.

Adjacent its front end the objective 16 is provided with additional threads 28 coacting with inner threads of a second threaded ring 30 which is provided with an index 32 coacting also with graduations $p$ of object distances. The ring 30 carries the optical system 34, and a second optical system is situated within the objective 16 behind the system 34 and indicated at 35.

Thus, with this embodiment the operator will turn the ring 20 in order to focus the image at the plane 12, the entire objective being bodily moved at this time along the optical axis. The operator will note that graduation $p$ which is aligned with index 26, and then the ring 30 will be turned by the operator to align the index 32 with the same graduation $p$ situated at the front end region of the objective. In this way the optical system 34 will be moved with respect to the other optical system to provide a predetermined focal length for the particular object distance.

Figure 5:
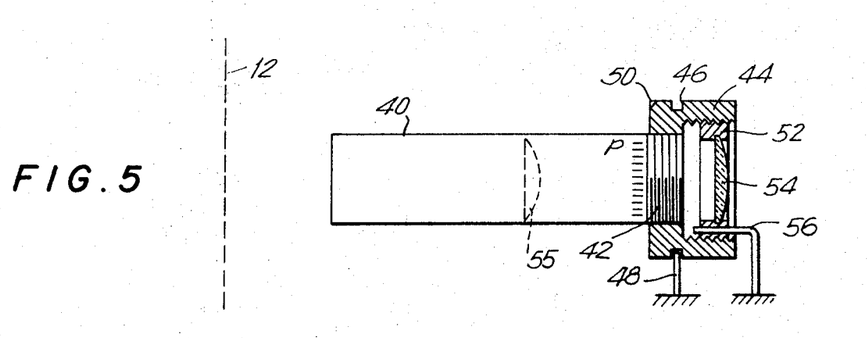
FIG. 5 is a schematic representation, partly in section, of another embodiment of a lens of the invention also schematically shown in association with a camera.

Referring to FIG. 5, a camera similar to that of FIG. 4 provides the film or image plane 12. However, in this case the objective 40 is provided only at its front region with threads 42. This objective 40 is supported in the same way as the objective 16 on the camera housing for axial movement along the optical axis while being prevented from rotating about the optical axis.

The threads 42 coact with the inner threads of a single adjusting ring 44 which is formed with an annular groove 46 which receives a stationary pin 48, so that upon turning of the ring 44 the entire objective will be displaced along the optical axis, and when the image is focused at the plane 12 the index 50 of the ring 44 will be aligned with a given one of the graduations $p$ indicating object distances.

Adjacent its front end the ring 44 is internally threaded to coact with the outer threads of a ring 52 carrying the optical system 54 which coacts with a rear optical system situated within the objective 40 and which is illustrated at 55. This threaded ring 52 which carries the optical system 54 is formed with a bore passing axially therethrough and slidably receiving a stationary pin 56 so that while the ring 52 can move axially it cannot rotate.

Thus, with this embodiment when the ring 44 is turned the objective 40 will be displaced along the optical axis and at the same time the optical system 54 will be moved with respect to the second optical system so that simultaneously with the focusing of an image there is an automatic adjustment of the focal length providing in this case also predetermined focal lengths for predetermined object distances, respectively.

It is apparent, therefore, that with both of these embodiments the lens includes a means for providing relative motion between the two optical systems as well as for moving both of these systems along the optical axis. This means includes at least one rotary ring, namely the ring 30 or the ring 44, by which the focal lengths are adjusted, and the adjustment of the focal length is carried out in accordance with the object distance graduations $p$. These focal lengths are adjusted, in the manner set forth above, so that for each object distance there will be a focal length which will prevent any creeping or shifting of the image with respect to the plane 12.

This invention relates to a simplified varying focal length lens, controllable through a single ring nut, for use in rotating cameras, preferably rotating head cameras.

More particularly, the invention is concerned with applying a varying focus lens to a rotating head camera capable of photographing at azimuthal angles of 360° and more.

Rotating head cameras are described in U.S. Pat. No. 3,363,527 issued to the present applicant, and reference is made to this patent for further details as to construction and principles on which such cameras are based.

It is desirable to reduce the horizontal and vertical dimensions in rotating head cameras and to overcome some substantial defects occurring in the pictures as provided by rotating lens cameras when the latter are used for photographing objects at distances differing substantially from one another. More particularly, the varying focus lens is selected so that as pointed out above, when applied to rotating cameras, the following mathematical relation between the object distance and lens is satisfied:

$$p = f$$

$$\frac{2fo - (CQ_0 + N_1 N_2) \pm \sqrt{(CQ_0 + N_1 N_2)^2 + 4ffo - 4f(CQ_0 + N_1 N_2)}}{2(fo - fo)}$$

Particularly, the focal length adjusting ring nut is graduated at object distances "$p$" calculated to satisfy the above formula, the $p$ root of this formula being selected so that $p > f > 0$, and wherein:

$f$ = focal length as time by time selected;
$fo$ = focal length of the lens corresponding to infinite object shot;
$CQ_o$ = distance of center of rotation from the film;
$N_1 N_2$ = distance between the nodal points of the entire lens system.

As indicated above, the lens has two ring nuts, both of which graduated at $p$ distances from the object, one of said ring nuts serving for focusing, and the other for varying the focal length. However, there is also the above embodiment provided with one ring nut only, operating so as to provide both for focusing and varying the focal length in accordance with the distance, coordinating the movements of the lens as a single unit and the movable optical parts of said lens.

The basic principles for applying varying focus length lenses to rotating cameras include the following general formula:

$$p = f$$

$$\frac{2fo(CQ_0 + N_1 N_2) \pm \sqrt{(CQ_0 + N_1 N_2)^2 + 4ffo - 4f(CQ_0 + N_1 N_2)}}{2(fo - f)} \quad (10)$$

wherein the object distance is correlated to the focal length and the several members have the meaning as previously indicated.

For simplicity, in formula (10):

$$A = CQ_o + N_1 N_2$$

then, $$p = \frac{f \cdot 2fo - A \pm \sqrt{A^2 \pm 4ffo - 4fA}}{2(fo-f)}$$

representing the root for the quadratic equation:
$p^2(fo-f) - pf(2fo-A) + f^2fo - f^2A = 0.$
in turn derived from:

$$\frac{p^2 - (p-f)A}{(p-f)^2} f = fo \qquad (13)$$

In view that (according to the convention as established previously):
$CN_1 = N_1N_2 - CN_2 = N_1N_2 - (q - CQ_0) = CQ_0 + N_1N_2 - q$ $$= A \frac{pf}{p-f}$$

($q$ distance from $N_2$)
and thus:

$$A = CN_1 + \frac{pf}{p-f}$$

When substituting this value in (13), it is:

$$\frac{p^2 - (p-f)\left(CN_1 + \frac{pf}{p-f}\right)}{(p-f)^2} f = fo$$

that is:

$$\frac{p - CN_1}{p-f} f = fo \qquad (14)$$

Figures 11, 12:
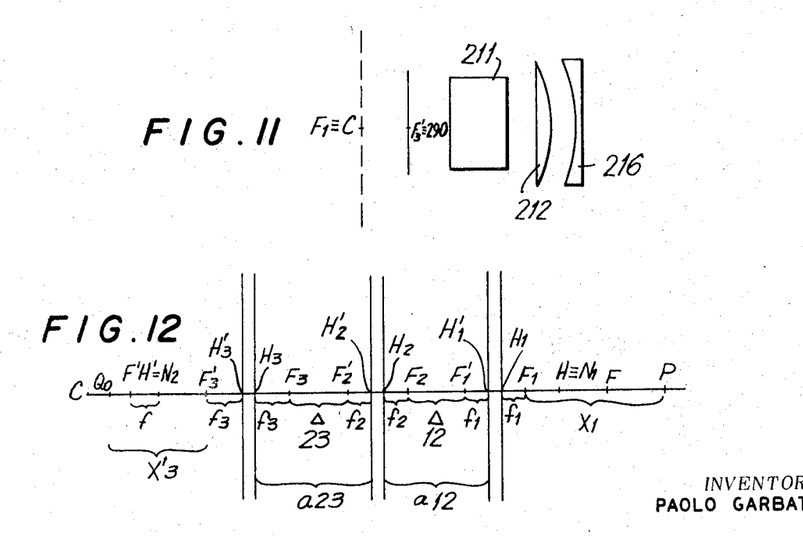
FIG. 12 is a diagrammatic view showing an optical three lens system, this figure being used for explaining the mathematical results as referred to in the following.

Consider now an optical system comprising three optical units, such as diagrammatically shown in FIG. 12, wherein:
$CP=$ main optical axis for the lens or optical system;
$P=$ object;
$Qo=$ image;
$C=$ axis of rotation for the rotating camera carrying said lens;
$F$ and $F^1=$ first and second focuses of the lens;
$H=N_1=$ first nodal point of the lens;
$H^1=N_2=$ second nodal point of the lens;
$F'_1; F'^1; H_1; H'_1=$ focuses and nodal points of the first optical unit;
$F_2; F'_2; H_2; H'_2=$ focuses and nodal points of the second optical unit;
$F_3; F'_3; H_3; H'_3=$ focuses and nodal points of the third optical unit;
$f_1; f_2; f_3=$ focal lengths of the three optical units;
$f=$ focal length of the lens;
$X_1=PF_1=$ distance from the object to the first focus of the first optical unit;
$X'_3=Q_oF'_3=$ distance from the image to the second focus of the third optical unit;
$\Delta 12 = F'_1F_2$
$\Delta 23 = F'_2F_3$
$a_{12} = H'_1H_2$
$a_{23} = H'_2H_3$
bearing in mind that the following relations intervene between FIG. 12 and that mentioned herein previously:
$CH=CN_1 \qquad CH'=CN_2 \qquad HH'=-N_1N_2$
Elementary optics provides the following formulas:

$$X_3^1 = \frac{f_3^2(X_1\Delta_{12} - f_1^2)}{\Delta_{23}(X_1\Delta_{12} - f_1^2) - X_1f_2^2}$$

$$f = \frac{f_1f_2f_3}{\Delta_{12}\Delta_{23} - f_2^2}$$

$$H_1H = f_1 + \frac{f_1(f_1\Delta_{23} - f_2f_3)}{\Delta_{12}\Delta_{23} - f_2^2} \qquad (15)$$

Be:
$X'_3 = 0$
i.e., let the image plane $Q_o$ be coincident with the focal plane $F'_3$ of the third optical unit.
Then, from the first of (15) it is:

$$\Delta_{12} = \frac{f_1^2}{X_1} \qquad (16)$$

whereby the other two become:

$$f = \frac{f_1f_2f_3X_1}{\Delta_{23}f_1^2 - X_1f_2^2}$$

$$H_1H = f_1 + \frac{f_1X_1(f_1\Delta_{23} - f_2f_3)}{\Delta_{23}f_1^2 - X_1f_2^2} \qquad (17)$$

For $X_1 = \infty$, the first of (17) becomes:
$$fo = -f_1f_3/f_2 \qquad (18)$$
($fo=$ focal length of the lens for infinite objects). Since $fo$ has to be positive, it results that as the three focuses $f_1, f_2, f_3$ cannot be all negative, one of said focuses is negative, while the other two are positive.

For construction convenience it is selected that
$f_1 < 0; \qquad f_2 > 0; \qquad f_3 > 0$
In (14) the numerator is:
$p - CN_1 = p + CH = PH + CH = PF_1 + CF_1 = X_1 + CF_1$
Further, it is:

$p = PN_1 = PH = X_1 + f_1 - H_1H = X_1 + f_1 - f_1$ $$\frac{-f_1X_1(f_1\Delta_{23} - f_2f_3)}{\Delta_{23}f_1^2 - X_1f_2^2} = \frac{f_1f_2f_3X_1 - X_1^2f_2^2}{\Delta_{23}f_1^2 - X_1f_2^2}$$

and, therefore, in view of the first of (17), the denominator of (14) becomes:

$$p - f = \frac{f_1f_2f_3X_1 - X_1^2f_2^2}{\Delta_{23}f_1^2 - X_1f_2^2} - \frac{f_1f_2f_3X_1}{\Delta_{23}f_1^2 - X_1f_2^2} = -\frac{X_1^2f_2^2}{\Delta_{23}f_1^2 - X_1f_2^2}$$

By replacing the values in (14), it is:

$$X_1CF_1 \cdot \frac{f_1f_2f_3X_1}{\Delta_{23}f_1^2 - X_1f_2^2} = \frac{f_1f_3}{f^2} - \frac{X_1^2f_2^2}{\Delta_{23}f_1^2 - X_1f_2^2}$$

from which by reducing:

$$\frac{X_1 + CF_1}{X_1} = 1$$

and finally:

$$CF_1 = 0 \qquad (19)$$
$$F_1 = C$$

From formulas (19) it is apparent that the first focus for the first optical unit should be on the axis of rotation and the latter may not pass through the second nodal point of the lens where rotating head cameras are involved, while it should pass through the second nodal point when the lens is adjusted to infinite where only rotating lens cameras are concerned.

Figure 6:
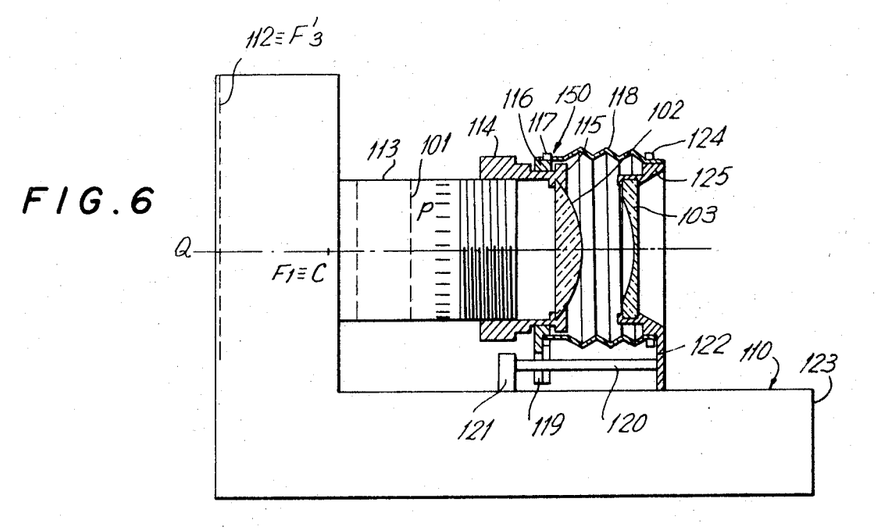
FIG. 6 is a schematic view of a lens, comprising three optical units, shown in a longitudinal sectional view so as to better show the device serving through the control ring nut to move one of the optical units relative to the other units in the optical system of the lens.
Figure 7:
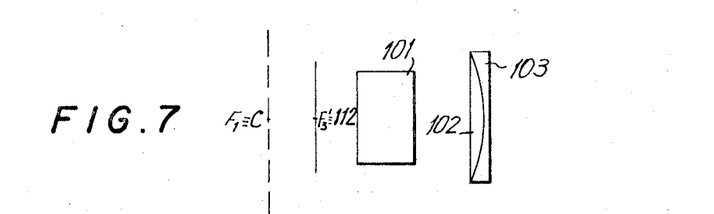
FIG. 7 is a diagrammatic side view showing the relative position for the optical units of the lens when the latter is set to photograph infinitely distant objects.
Figure 8:
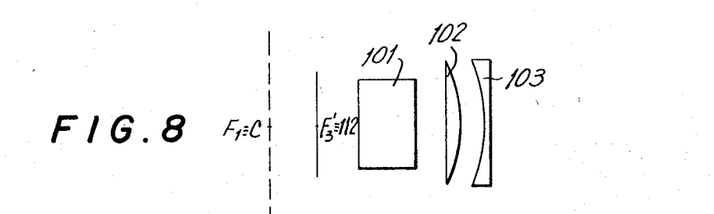
FIG. 8 is a view similar to that of FIG. 7, but with the lens adjusted for objects located at the least distance consistent with the type of lens.

Following these previous statements, in the embodiment of FIGS. 6—8 the varying focus lens 150 comprises:

a. a first optical unit 101 having a focal length $f_3$ which may be an ordinary photographic lens carried fixed on the camera (fixed focus);

b. a unit 102 having a focus $f_2$ carried in advance of unit 101 and movable by means of a ring nut 114 cooperating with a scale graduated in $p$ distances from the object in accordance with formula (10);

c. a unit 103 having a focal length $f_1$ and carried in advance of the other two units, fixed relative to unit 101 and hence to the camera.

Therefore, as a result, only the intermediate unit 102 will move between the two fixed units 101 and 103.

The magnitude of this movement is readily obtained (see FIG. 12):
$$a_{12} = \Delta_{12} + f_1 + f_2$$
from which owing to (15);
$$a_{12} = (f_1^2/X_1) + f_1 + f_2$$
Now, supposing:
$$p_1 = PH_1 = X_1 + f_1$$
the preceding relation becomes:
$$a_{12} = (f_1^2/p_1 - f_1) + f_1 + f_2 \qquad (20)$$
As a particular case, as that shown in the figures of the drawing, the unit 103 comprises one negative (concave flat) lens only having a focal length $f_1$ and unit 102 one positive (convex flat) lens only having a focal length $f_2$. The two units being concerned are selected so that:

$$f_1 = -f_2 < 0 \qquad (21)$$

Where using the same glasses for the construction thereof (same refractive index and ABBE number) and arranging the lenses with the curved faces thereof at a facing position, when contacting an equivalent of a parallel flat plate is provided.

In this case, (18) becomes:

$$f_o = f_3$$

while (19) remains unaltered, i.e.:

$$CF_1 = 0$$

and (20) is simplified as follows:

$$a_{12} = f_1/p_1 - f_1$$

Lens 150 is fixedly carried in any known manner by the rotating head camera, designated as a whole at 110.

The lens is located in front of film 112 and comprises a tubular housing 113 serving as a support, wherein the optical unit 101 is accommodated. At the end of housing 113 a thread is provided, as well as a scale graduated in $p$ distances from the object, such distances being in relation with the focal length of the lens in accordance with formula (10).

On the threaded end a ring nut 114 is screwed and provided with a reference mark (not shown) for indicating the $p$ values.

At the projecting end thereof, ring nut 114 has a groove 115. A ring 116 is rotatably mounted in groove 115. By a ring 117 the end of a flexible bellows 118, such as normally used in cameras, is clamped on ring 116. At its bottom, ring 116 has a fork 119 straddling a rod 120 parallel to the optical axis $C-Q$ of the lens.

Rod 120 is attached to two supports 121, 122 fixed with the body member 123 of the camera. Therefore, when the ring nut 114 is rotated, rings 116, 117 and bellows 118 axially move, but without rotating.

Ring nut 114 carries the positive lens 102. The other end of bellows 118 is clamped by a ring 124 to an annular member 125 carrying the negative lens 103. Member 125 is rigidly connected to support 122 and, thus, is fixed.

Therefore, the rotation of ring nut 114 causes the lens 102 to move towards and away from lens 103 and fixed optical unit 101. More particularly, lenses 102 and 103 may, as stated and shown in FIG. 7 approach each other and constitute, owing to construction thereof as previously pointed out, a parallel flat plate. This is the case when photographing infinitely distant objects.

The lens is provided and mounted so that, as from the foregoing mathematical treatment:

a. the image plane 112 is coincident with the focal plane $F'_3$ of the optical unit 101;

b. focus $F_1$ of optical unit 103 is substantially coincident with the center of rotation C for the camera. It is not essential that this coincidence be accurate to achieve satisfactory photographic results.

It will be sufficient to control that the slipping, or relative displacement between the image and film, is less than the resolution eye power, which practically results in relation $$St \leq \frac{f}{3000}$$, where $f$ (in mm.) indicates the focal length of the lens. It will be sufficient that this condition be satisfied at the most unfavorable conditions in order that the slipping rate is within admissible limits at the other conditions. The most unfavorable conditions occur when having to photograph an object at the least distance for which the lens has been designed;

c. in a particular case, the first and second units 103 and 102 respectively comprise, as shown, one concave flat lens only, having a focal length $f_1$, and a positive lens (convex flat) having a focal length $f_2$, such that the absolute values and constituent materials thereof are the same, whereby, when such lenses contact, an equivalent to a parallel flat plate is achieved;

d. the third optical unit is a per se known ordinary fixed focus lens of the type as commonly used in cameras. More particularly, FIG. 7 shows the relative position for the optical units when set for infinitely distant objects, while FIG. 8 shows the relative position for objects at the least photographic distance, such as 1 m.

Figure 9:
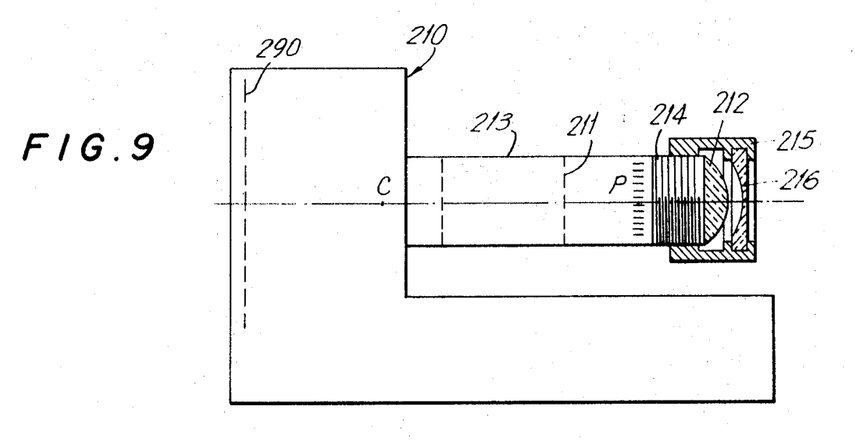
FIG. 9 is a schematic axial sectional view showing another embodiment of the lens according to the invention.
Figure 10:
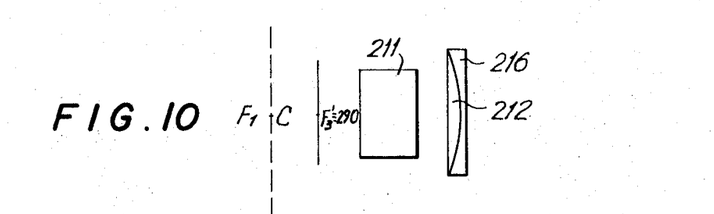
FIGS. 10 and 11 show the position for the optical units of the lens of FIG. 9 when set for infinite and least possible distance objects, respectively.

The embodiment as shown in FIGS. 9, 10 and 11 differs from the preceding embodiment in that the changeability of the focal length is assigned to the movement of the optical unit which is closest to the object. This embodiment differs from the preceding embodiment because of a greater simplicity in the focal length adjusting means.

Thus, as clearly seen in FIG. 9, the rotating head 210, having the film or image plane 290, carries a tubular housing 213, wherein the second and third optical units 211 and 212 are fixedly located. As in the previous case, the third unit is an ordinary fixed focus lens, and the second unit is a convex flat lens. This lens is secured to the end of the tubular housing which is threaded at its end at 214. At this end a reference index is also provided. On the threaded end a ring nut 215 is screwed and provided with a scale having $p$ values (such values are correlated to $f$ in accordance with formula 1). This ring nut carries a concave flat lens 216. The concave flat lens is complementary to the convex flat lens as in the example of FIGS. 6—8. When the camera is shooting infinitely distant objects, the two lenses 212, 216 take the position shown in FIG. 10, thus forming a parallel flat plate. When the camera is shooting objects at the least distance, the position for the two lenses is that as shown in FIG. 11.

In the previous treatment it has been stated that the first focus $F_1$ of the first optical unit should coincide with the center of rotation for the camera. Now, it will be apparent that in the embodiment shown in FIGS. 9—11 this condition cannot be satisfied (see FIG. 9) since the first optical unit 216 is movable, while the center of rotation C is fixed. But also in this case the slipping, or relative movement between the image and film, can be within admissible limits by taking care that $F_1$ coincides with C when photographing, as shown in FIG. 11, objects at the least distance the particular lens can photograph.

It will be sufficient that $F_1$ is coincident with C under the conditions of the highest slipping, that is when objects are very closely located so that at the other positions of the object the slipping will be less: therefore, the displacement of $F_1$ from C has no significant importance.

In the above embodiments the threaded connections form one possible motion-transmitting means actuated by the ring means.

In the foregoing description it has been state that the optical system comprises three optical units. Actually however, as to the embodiment of FIGS. 9—11, the optical system may be also considered as comprising two optical units only, that is the movable front lens 216 and the assembly of the convex flat lens 212 and conventional fixed focus lens 213. The mathematical considerations in the foregoing apply therefore to two unit optical systems, but wherein:

a. the movable unit and a lens or part of the fixed forwardly located unit are optically complementary, or such as to provide an analogy with a parallel flat plate when photographing infinite objects; and a. the fixed unit may be divided into two subunits.

Although the invention has been described in connection with two optical units comprising two simple lenses, that is a concave flat lens and a convex flat lens, it will be apparent that more complex optical units are within the scope of the invention.

The systems of FIGS. 6 and 9 may be applied both to rotating head cameras and also rotating lens cameras, since the axis of rotation for the latter should pass through the second nodal point of the lens when the lens is set at infinity.

I claim:

1. A variable focal length lens to prevent image creeping on a rotary camera turnable about a given axis of rotation, comprising at least two optical systems having a common optical axis normal to said axis of rotation, and respectively including a pair of lens mounts, motion-transmitting means operatively connected with said mounts for providing a relative axial motion therebetween and for moving at least one of said mounts along the optical axis, and manually turnable ring means operatively connected to said motion-transmitting means for actuating the latter, said ring means being turnable to predetermined angular positions for providing predetermined combinations of object distances and focal lengths, said angular positions being determined by graduations in object distances $p$ which satisfy the following formula:

$$p = f \frac{2f_0 - CQ_0 - N_1N_2 \pm \sqrt{(CQ_0 - N_1N_2)^2 - 4f(f_0 - CQ_0 - N_1N_2)}}{2(f_0 - f)}$$

the root of $p$ being such that $p > f > o$, and wherein:
$f=$ the focal length selected in each case;
$f_o=$ focal length of lens are required for taking pictures of objects at the infinity;
$CQ_o=$ Distance of rotation center from the film;
$N_1N_2=$ Distance between the nodal points of the whole lens system; and also satisfy the following formula, which is a particular case of the preceding one:

$$\frac{f_0 - N_1N_2 \pm \sqrt{(f_0 + N_1N_2)^2 - 4fN_1N_2}}{2(f_0 - f)}$$

wherein all terms have the same meaning as set forth above, and which is obtained from the preceding formula by putting $CQ_o = f_o$, i.e. by causing the rotation center (C) to coincide with the second nodal point, when taking a picture of an object at infinity.

2. A lens according to claim 1, and wherein said ring means includes two rotary rings, both of which are angularly set according to graduations in distances of the object, one of said rings adjusting the focal length and the other of said rings serving for the focusing.

3. A lens according to claim 1 wherein said ring means includes only one rotary ring angularly positioned according to graduations in distances of the object and controlling the relative motion of the optical systems as well as the motion of said systems as a whole.

4. A lens according to claim 1, characterized in that the values of $p, f, f_o$, are obtained—in the particular case of a lens with variable focal length and consisting of two optical systems only—in the already known manner from the hereinafter stated relations:

$p=PN_1$ (distance of the object from the first nodal point of the assembly), $$f = -\frac{f_1 f_2}{a - f_1 - f_2}$$

$$f_0 = -\frac{f_1 f_2}{a_0 - f_1 f_2}$$

($a_0$: Distance between the two systems for $p = \infty$):

$$N_1N_2 = -\left(H_1H'_1 + H_2H'_2 + \frac{a^2}{a - f_1 - f_2}\right)$$

where $H_1$, $H'_1$ respectively are the first and second nodal points of a system having a focal length $f_1$; $H_2H'_2$ respectively are the nodal points of the second system having a focal length $f_2$; $N_1N_2$ respectively are the nodal points of the whole assembly; $a$ is the distance between the nodal points $H'_1$ and $H_2$; $f$ is the focal length of the whole assembly and $f_o$ is the focal length corresponding to the distance $a_o$ between the two systems.

5. The combination of claim 1 and wherein said ring means includes at least one rotary ring for adjusting the focal length, and said ring means also including an object distance graduation for determining the angular position of said ring.

6. The combination of claim 5 and wherein said ring means includes a pair of rotary rings one of which is said ring for setting the focal length according to the object distances and the other of which is a rotary ring for displacing both optical systems along the optical axis as a unit for focusing purposes.

7. The combination of claim 5 and wherein said ring means includes only said one rotary ring, said ring, when rotated by the operator, coacting with the remainder of said means for displacing both of the optical systems along the optical axis as well as for changing the distance between the two optical systems.

8. The combination of claim 1 and wherein said systems form the equivalent of a parallel flat plate when set at infinity, and one of said systems having a first focus substantially lying on said axis of rotation when set for objects at the closest distance for the lens.

9. In a lens according to claim 8, one of said systems comprising a fixed focus lens.

10. In a lens according to claim 8, said systems respectively comprising a convex-flat lens and a concave-flat lens both having equal positive and negative characteristics, so that the approaching thereof, toward each other as a result of movability for said one of said lenses, will provide the equivalent of a parallel flat plate.

11. In a lens according to claim 10, a ring nut operatively connected to the concave-flat lens, for moving the same.

12. In a lens according to claim 10, a ring nut operatively connected to said convex-flat lens, for moving the same.

13. In a lens according to claim 10, the first focus for the concave-flat lens being substantially coincident with the intersection between the axis of rotation for the rotating head and the optical axis of the lens.